(12) United States Patent
Sunaga et al.

(10) Patent No.: US 7,061,202 B2
(45) Date of Patent: Jun. 13, 2006

(54) AUTOMOBILE SERVOMOTOR CONTROLLER

(75) Inventors: Hideki Sunaga, Tokyo (JP); Futoshi Araki, Tokyo (JP); Kaoru Tanaka, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/848,850

(22) Filed: May 18, 2004

(65) Prior Publication Data

US 2005/0001578 A1   Jan. 6, 2005

(30) Foreign Application Priority Data

May 22, 2003   (JP)   ............................. 2003-145411

(51) Int. Cl.
   *G05B 5/01*   (2006.01)

(52) U.S. Cl. .................. 318/615; 318/625; 318/611; 318/562; 236/13; 236/49.3; 236/51; 236/75; 236/165; 165/202

(58) Field of Classification Search ............... 318/600, 318/601, 626, 624, 636, 618, 604, 605, 569, 318/478, 479, 466, 467, 468, 469, 447–449, 318/602, 603, 280–283, 286; 236/13, 51, 236/49.3, 75; 165/43, 202; 454/75
   See application file for complete search history.

(56) References Cited

U.S. PATENT DOCUMENTS

| | | | | |
|---|---|---|---|---|
| 4,275,676 A | * | 6/1981 | Baba | 114/144 E |
| 4,276,640 A | * | 6/1981 | McNamee et al. | 370/360 |
| 4,328,855 A | * | 5/1982 | Iwata et al. | 165/202 |
| 4,375,900 A | * | 3/1983 | Tachibana et al. | 297/330 |
| 4,381,074 A | * | 4/1983 | Iijima et al. | 236/13 |
| 4,388,571 A | * | 6/1983 | Tada et al. | 318/293 |
| 4,391,320 A | * | 7/1983 | Inoue et al. | 165/204 |
| 4,417,312 A | * | 11/1983 | Cronin et al. | 700/282 |
| 4,463,296 A | * | 7/1984 | Tada et al. | 318/452 |
| 4,473,786 A | * | 9/1984 | Miyashita et al. | 318/561 |
| 4,549,125 A | * | 10/1985 | Sonobe | 318/663 |
| 4,591,773 A | * | 5/1986 | Numata | 318/663 |
| 4,616,164 A | * | 10/1986 | Kenny et al. | 318/666 |
| 4,640,183 A | * | 2/1987 | Doi | 454/75 |
| 4,647,827 A | * | 3/1987 | Toyoda et al. | 318/592 |
| 4,712,053 A | * | 12/1987 | Numata | 318/663 |
| 4,739,238 A | * | 4/1988 | Sugiyama et al. | 318/630 |
| 4,818,924 A | * | 4/1989 | Burney | 318/561 |
| 4,819,715 A | * | 4/1989 | Kobayashi | 165/203 |
| 4,922,177 A | * | 5/1990 | Mausner | 318/663 |
| 4,953,630 A | * | 9/1990 | Iida | 165/231 |

(Continued)

FOREIGN PATENT DOCUMENTS

EP   0300722   7/1988

(Continued)

*Primary Examiner*—David Martin
*Assistant Examiner*—Robert W. Horn

(57) ABSTRACT

An automobile servomotor controller includes a master control unit having a master control circuit for transmitting a designation signal and a slave unit having a motor and a control circuit which controls driving of a motor by outputting an operation signal to a driving device depending upon said designation signal. The slave unit is constructed by a same feedback control unit having a non-feedback control unit for inhibiting the operation of the motor until a target is changed by an input of a new designation signal with a target reached state and a feedback control unit for driving the motor to reach a target state by detecting a present position value with a position detecting device, and a control inhibiting signal for inhibiting the feedback control is individually provided to the designation signal transmitted from the master control circuit to the non-feedback control unit.

6 Claims, 12 Drawing Sheets

U.S. PATENT DOCUMENTS

| | | | |
|---|---|---|---|
| 4,974,776 A * | 12/1990 | Oshizawa | 236/13 |
| 5,050,795 A * | 9/1991 | Knittel | 236/13 |
| 5,252,900 A * | 10/1993 | Uehara et al. | 318/568.11 |
| 5,305,316 A * | 4/1994 | Yoshida et al. | 370/357 |
| 5,311,451 A * | 5/1994 | Barrett | 700/278 |
| 5,455,495 A * | 10/1995 | Bec | 318/560 |
| 5,600,634 A * | 2/1997 | Satoh et al. | 370/294 |
| 5,648,897 A * | 7/1997 | Johnson et al. | 700/83 |
| 5,666,036 A * | 9/1997 | Swanson | 318/295 |
| 5,705,907 A * | 1/1998 | Miyamori et al. | 318/599 |
| 5,803,355 A * | 9/1998 | Ureshino et al. | 236/13 |
| 5,902,180 A * | 5/1999 | Sunaga et al. | 454/69 |
| 5,906,541 A * | 5/1999 | Mizuno | 454/75 |
| 5,908,154 A * | 6/1999 | Sunaga et al. | 236/49.3 |
| 6,009,934 A * | 1/2000 | Sunaga et al. | 165/42 |
| 6,016,964 A * | 1/2000 | Ohkubo | 236/13 |
| 6,020,708 A * | 2/2000 | Matsumoto et al. | 318/601 |
| 6,273,771 B1 * | 8/2001 | Buckley et al. | 440/84 |
| 6,615,697 B1 * | 9/2003 | Nakagawa | 82/118 |
| 6,639,508 B1 * | 10/2003 | Martin | 338/162 |
| 6,801,007 B1 * | 10/2004 | Takeuchi et al. | 318/479 |
| 6,827,284 B1 * | 12/2004 | Ichishi et al. | 236/49.3 |
| 6,868,317 B1 * | 3/2005 | Okuyama | 701/21 |
| 6,877,669 B1 * | 4/2005 | Sunaga et al. | 236/51 |
| 6,879,880 B1 * | 4/2005 | Nowlin et al. | 700/260 |
| 6,888,289 B1 * | 5/2005 | Heilig et al. | 310/323.17 |
| 2002/0096573 A1 * | 7/2002 | Bruzy et al. | 236/75 |
| 2003/0111974 A1 * | 6/2003 | Suzuki | 318/661 |
| 2004/0194913 A1 * | 10/2004 | Umebayashi et al. | 165/42 |
| 2004/0232872 A1 * | 11/2004 | Sunaga et al. | 318/652 |
| 2005/0056413 A1 * | 3/2005 | Homan et al. | 165/203 |

FOREIGN PATENT DOCUMENTS

| | | |
|---|---|---|
| EP | 0773488 | 5/1997 |
| EP | 0820886 | 1/1998 |
| JP | 09-134218 | 5/1997 |
| JP | 10006748 | 1/1998 |
| JP | 11-048741 | 2/1999 |

* cited by examiner

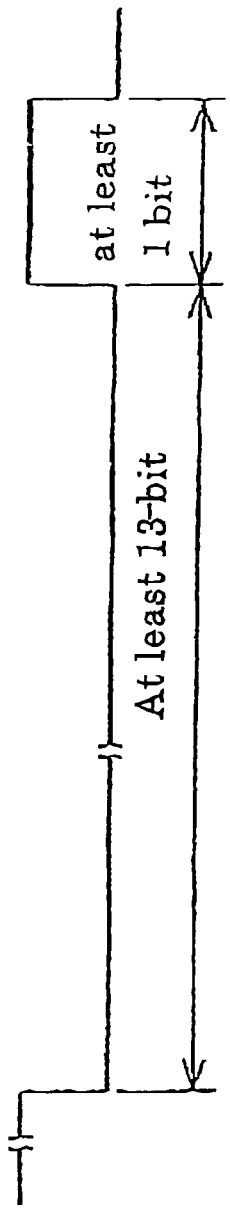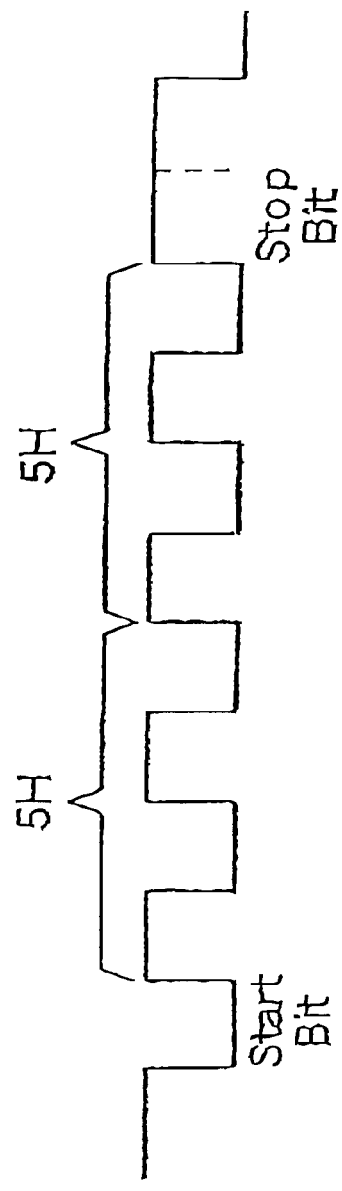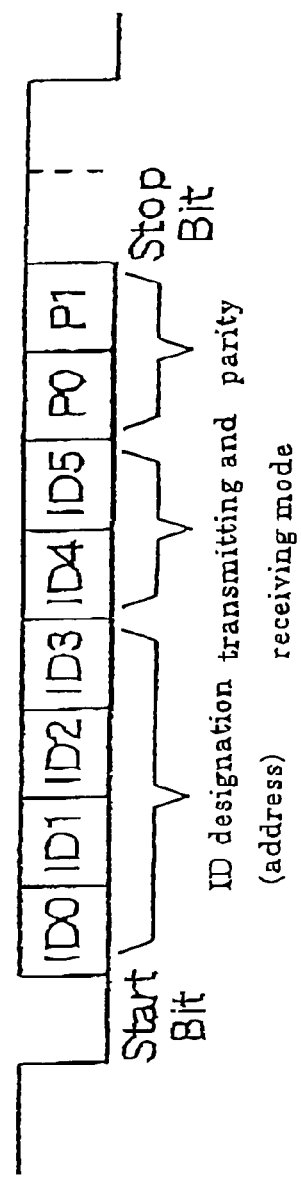
FIG. 10A SynchBreak Field
FIG. 10B SynchField
FIG. 10C ID Field DATA1 Field DATA2 Field Check sum Field

AUTOMOBILE SERVOMOTOR CONTROLLER

FIELD OF THE INVENTION

The present invention relates to an automobile servomotor controller used for driving control of an actuator which opens and closes each door provided in an automobile air-conditioning device. More particularly the invention relates to an automobile servomotor controller which includes a slave actuator performing different controls.

DESCRIPTION OF RELATED ART

There has been known a conventional air conditioner 1 which is mounted on a compartment of an automobile, etc. as shown in FIG. 12 (See JP-A-1-48741).

The conventional air conditioner 1 is mainly constituted by an intake unit 2 for introducing interior air and fresh air at a desired ratio by rotating of a blower fan 2*c* through interior and fresh air intake openings 2*a*, 2*b* which are contained in an air-conditioning unit, a cleaning unit 3 in which an evaporator 3*a* is provided, and a heater unit 4 in which a heater core 4*a* is disposed.

The intake unit 2 is provided with an intake door 2*e* to selectively open or close the interior and the fresh air intake openings 2*a*, 2*b* by means of driving an intake door actuator 2*d*.

The heater unit 4 is provided with an air mixing door 4*b* upstream of the heater core 4*a*, and is constituted such that warmed air passing the heater core 4*a* and non-heated cool air bypassing the heater core 4*a* are adjusted by core 4*a* and non-heated cool air bypassing the heater core 4*a* are adjusted by driving an air mixing door actuator 4*c*.

A defrosting blowout opening 5, a ventilation blowout opening 6, and a foot blowout opening 7, etc. disposed in the compartment side are provided with a defrosting door 5*a*, ventilation door 6*a*, and a foot door 7*a* as mode doors corresponding to each of the blowout openings. Each of the blowout openings 5 to 7 is constituted to be openable and closeable by driving mode actuators 8 to 10 which are provided corresponding to respective doors 5*a* to 7*a*.

Each of actuators 2*d*, 4*c*, and 8 to 10 is provided with a motor 11 for driving each door, a PBR (potential balance resistor) 12 for detecting a present position of the door as voltage, and a control IC 13. The motor 11 and the PBR 12 are connected to the control IC 13.

Each of the actuators 2*d*, 4*c*, and 8 to 10 is connected to an air-conditioning controller 16 via a common power source wire 14 and communication line 15. A switching operation of an operation panel 17 and values detected by various sensors such as an interior air sensor 18, a fresh air sensor 19, a solar radiation sensor 20, a suction temperature sensor 21, and the like are referred to the controller 16, and the rotation frequency of each motor 11, etc. is determined by the air-conditioning controller 16.

A control IC 22*a* of a fan control circuit 22 is connected to the air-conditioning controller 16 through the power source wire 14 and the communication line 15. The control IC 22*a* is configured to control rotation signal of the serial communication to be performed by the communication line 15.

Next, the explanations about the conventional air-conditioner 1 will be given.

In the conventional automobile air-conditioner thus constructed, the communication signals which are dealt between the air-conditioning controller 16 and each of the actuators 2*d*, 4*c*, and 8 to 10 are transmitted bi-directionally by the communication line 15, and so-called intercommunication type servomotor control is carried out.

That is, the serial communication signals which are transmitted from the air-conditioning controller 16 through the communication line 15 are received by each of the actuators 2*d*, 4*c*, and 8 to 10. After the signals are received by the actuators, each door 2*e*, etc. is opened or closed by the motor 11, and then the interior and fresh air intake openings 2*a*, 2*d*, and the like are opened or closed.

The present position of each door 2*e*, etc. is detected by the PBR 12 as voltage, and is driven to be opened or closed by the motor 11, etc. so as to get closer to a target stoppage position.

An automobile servomotor controller having a hunting-preventing function is known as shown in FIG. 13 (See JP-A-9-134218).

In such a servomotor controller, each of the actuators 2*d*, etc. is provided with a stoppage range-setting circuit 24. The stoppage position of the intake door 2*e*, which is an object to be controlled, is set based on designated value data a of the received target position, and the present position of the intake door 2*e* is detected by the PBR 12.

A comparison circuit 25 compares the present position of the intake door 2*e* and the setup stoppage range, and outputs an outside stoppage range signal e and a rotating direction designating signal f if the intake door 2*e* does not achieve the stoppage range.

The outside stoppage range signal e is input to a driving initiation judging circuit 26. If the outside stoppage range signal e is continued for a predetermined time or longer, a driving permitting signal is output from the driving initiation judging circuit 26 to a driving circuit 27.

Accordingly, when the driving permitting signal is output, the motor 11 is driven by the driving circuit 27 in the direction indicated by the rotating direction designating signal f.

Instantaneous ON/OFF signals by outside noise are not therefore input to the driving circuit 27, and the rotation stoppage position of the intake door 2*e*, etc. is well positioned.

However, in the conventional automobile servomotor controller illustrated in FIG. 13, chattering has occurred due to interfusion of outside noise unless a complicated circuit structure such as the driving initiation judging circuit 26 is provided.

If the intake door 2*e* is formed by a flexible material, the position of a leading end 2*s* of the intake door 2*e* is shifted by airflow, and thus the opening and closing degree of the door is changed.

Consequently, the PBR 12 which is provided around a rotating shaft 2*t* of the intake door 2*e* and detects the rotational angle of the rotating shaft 2*t* had a problem that an accurate opening and closing degree of the door could not be detected.

In the automobile air-conditioner 1 including a door formed by such a flexible material and a door formed by a relatively hard and inflexible material, each of the actuators 2*d*, 4*c*, and the like comprising the control IC 13 of more than one type such as an IC for a feedback control and a non-feedback control unit for inhibiting the operation of the motor till the target is changed by an input of new designated signal, with a target reached state is required. Therefore, there is a problem that manufacturing costs are increased.

SUMMARY OF THE INVENTION

It is, therefore, an object of the present invention to provide an automobile servomotor controller in which an actuator without being influenced by outside noise and an actuator with preferable positional accuracy can be provided and connected to the same communication line.

The present invention has been made in view of aforementioned problems. According to a first aspect of the present invention, in an automobile servomotor controller including a master control unit having a master control circuit for transmitting a designation signal through a communication line and a slave unit having a motor and a control circuit which is connected to the master control unit through the communication line and controls the driving of a motor by outputting an operation signal to a driving device depending upon the designation signal, the slave unit having a non-feedback control unit for inhibiting the operation of the motor until a target is changed by an input of a new designation signal with a target reached state and a feedback control unit for driving the motor to reach a target state by detecting a present position value with a position detecting device is constructed by the same feedback control unit including the position detecting device, and a control inhibiting signal for inhibiting the feedback control is individually provided to the designation signal transmitted from the master control circuit to the non-feedback control unit.

In the automobile servomotor controller as constructed above, with the target reached state, the control inhibiting signal for inhibiting the feedback control is individually transmitted from the master control circuit to the non-feedback control unit for inhibiting the operation of the motor until the target is changed by the input of the new designation signal.

Therefore, with the target reached state, the actuator is operated as the non-feedback control unit for inhibiting the operation of the motor until the target is changed by the input of the new designation signal, and the operation of the motor is inhibited until the target is changed by the input of the new designation signal.

The actuator is operated as the non-feedback control unit by providing the feedback control unit in which the control inhibiting signal is transmitted to the position where chattering occurs, so that the chattering is prevented and the actuator is used as an actuator without being influenced by outside noise.

In the feedback control unit for driving the motor to reach the target position by detecting the present position value with the position detecting means, the feedback control can be performed depending upon the designation signal to be transmitted from the master control circuit without providing the control inhibiting signal for inhibiting the feedback control.

The control inhibiting signal for inhibiting the feedback control is not transmitted to the actuator which requires the positional accuracy, so that a desirable feedback control can be individually performed even if the actuator is connected to the same communication bus to which the same indication signal with the non-feedback control unit is transmitted.

All of the slave units are accordingly constructed by the same feedback control unit without requiring a plurality of communication lines, thus reducing the number of lines.

Therefore, the increase in the manufacturing cost can be controlled.

According to a second aspect of the present invention, the automobile servomotor controller is characterized that the position detecting device is provided apart from a center of a rotation shaft of a member to be turned by end portion of the member to be turned by the movement of the leading end portion along a turning locus.

In the automobile servomotor controller as constructed above, the movement of the leading end portion is detected by the PBR, so that the movement of the leading end portion can be detected even though the position of the leading end portion is shifted by airflow.

Therefore, the feedback control can be conducted in accordance with the change in the opening and closing degree of the member to be turned.

Furthermore, the actuator is operated as the non-feedback control unit by transmitting the control inhibiting signal in the position where the chattering occurs, so that the chattering can be prevented.

The slave unit is used as the actuator having a preferable positional accuracy and the actuator without being influenced by outside noise by the same feedback control unit.

The disclosures of Japanese patent application No. 2003-145411 (field on May, 22, 2003) including its specification, drawing, and claim are incorporated herein by reference in its entirety.

BRIEF DESCRIPTION OF THE DRAWINGS

FIG. 10 is a figure showing a first sheet of a data structure of each field in one frame of a LIN communication standard, FIGS. 10A, 10B, and 10C show a synch break field (Synch Break), a synch field (Synch), and an ID field (ID), respectively.

FIG. 11 is a figure showing a second sheet of the data structure of each field in one frame of a LIN communication standard.

DETAILED DESCRIPTION OF THE INVENTION

Figure 1:
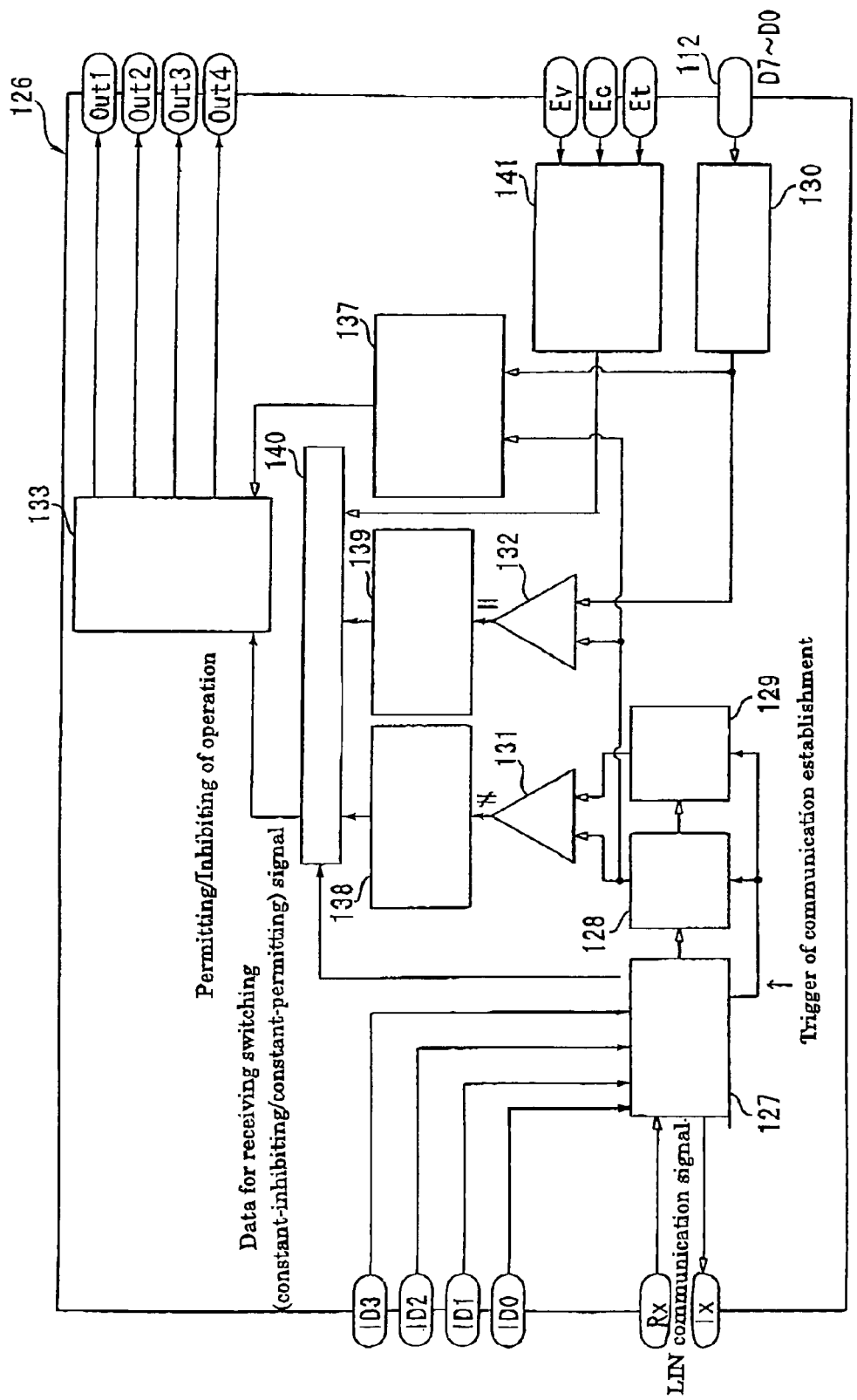
FIG. 1 is a block diagram for describing the structure of the logic circuit in a master control circuit constructing the automobile servomotor controller of the embodiment of the present invention.

FIGS. 1 to 11 illustrate an automobile servomotor controller according to the embodiment of the present invention.

The same reference numerals are given for parts which are the same as the related art example.

Figure 5:
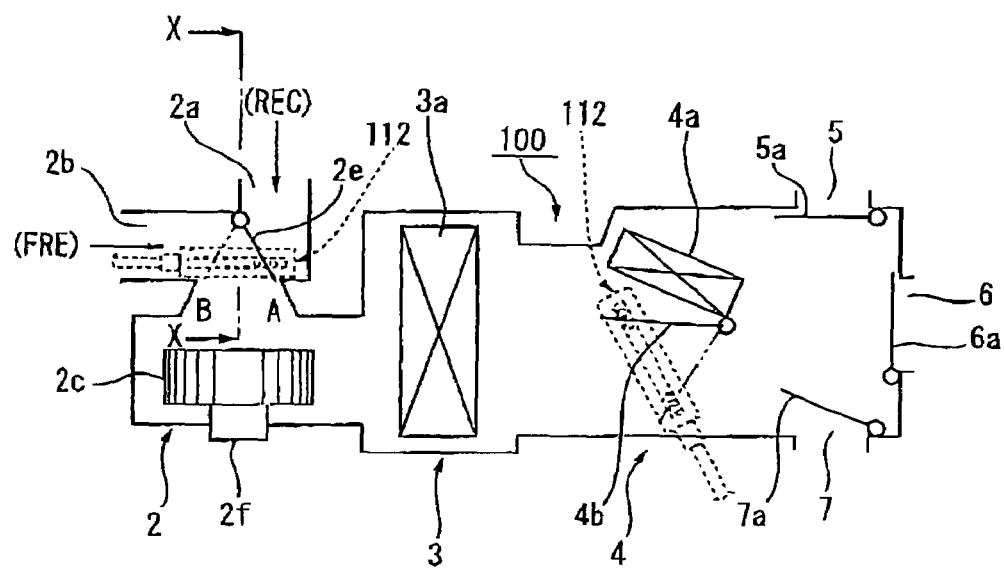
FIG. 5 is a view schematically showing the structure of the air-conditioning unit in which the automobile servomotor controller of the present invention is used.

To begin with describing the structure, the automobile servomotor controller of the present embodiment is applied to an air-conditioning unit 100 provided in the automobile shown in FIG. 5.

The air-conditioning unit 100 mainly comprises an intake unit 2 for introducing interior air and fresh air of a desired ratio by turning a blower fan 2c through interior and fresh air intake openings 2a, 2b, a cleaning unit 3 in which an evaporator 3a is provided, and a heater unit 4 in which a heater core 4a is disposed. The interior air and fresh air intake openings 2a, 2b are provided in the intake unit 2.

The intake unit 2 is provided with an intake door 2e for selectively opening and closing the interior and fresh air intake openings 2a, 2b by driving an intake door actuator 2d as a slave unit.

The fresh air (FRE) is introduced at a position A of the intake door 2e in FIG. 5, and the interior air is recycled (REC) at a position B shown therein.

The heater unit 4 is provided with a heater core 4a. An air mixing door 4b is disposed upstream of the heater core 4a. The mixed ratio between warmed air passing the heater core 4a and non-heated cool air bypassing the heater core 4a is adjusted by turning an air mixing door actuator 4c as a slave unit.

A defrosting door 5a, a ventilation door 6a, and a foot door 7a as mode doors are provided at each of blowout openings: a defrosting blowout opening 5, a ventilation blowout opening 6, and a foot blowout opening 7 disposed in a vehicle compartment.

These defrosting, ventilation, and foot doors 5a, 6a, 7a have predetermined rigidity, and are made of an inflexible hard material. These doors are disposed in the air-conditioning unit 100 with the relatively flexible intake and mixing doors 2e, 4b.

Doors 5a to 7a are provided with mode actuators 8 to 10 as slave units, respectively. Each of the blowout openings 5 to 7 can be opened or closed by turning an actuator lever 11d of each mode actuator 8 to 10 via a link mechanism not shown.

In the slave unit, the mode actuators 8 to 10 of non-feedback control units, which inhibit operation of a motor 11 until a target is changed by the input of a new designation signal, with a target reached state, and the intake and air mixing door actuators 2d, 4c of feedback control units which drive the motor 11 by detecting the present position value with an PBR 112 as a position detecting means in order for the position to reach the target state are included. Each of these actuators comprises the PBR 112 for detecting the present positions of each door 2e, 4b as the voltage and a control circuit 120 as the feedback control unit having the same structure.

Each of these actuators 2d, 4c, and 8 to 10 is accommodated in casing 102, 104, and 108 to 110, respectively. The motor 11 for driving each door 5 to 7 and the PBR (potential balance resistor) 112 are connected to each control circuit 120.

Figure 7:
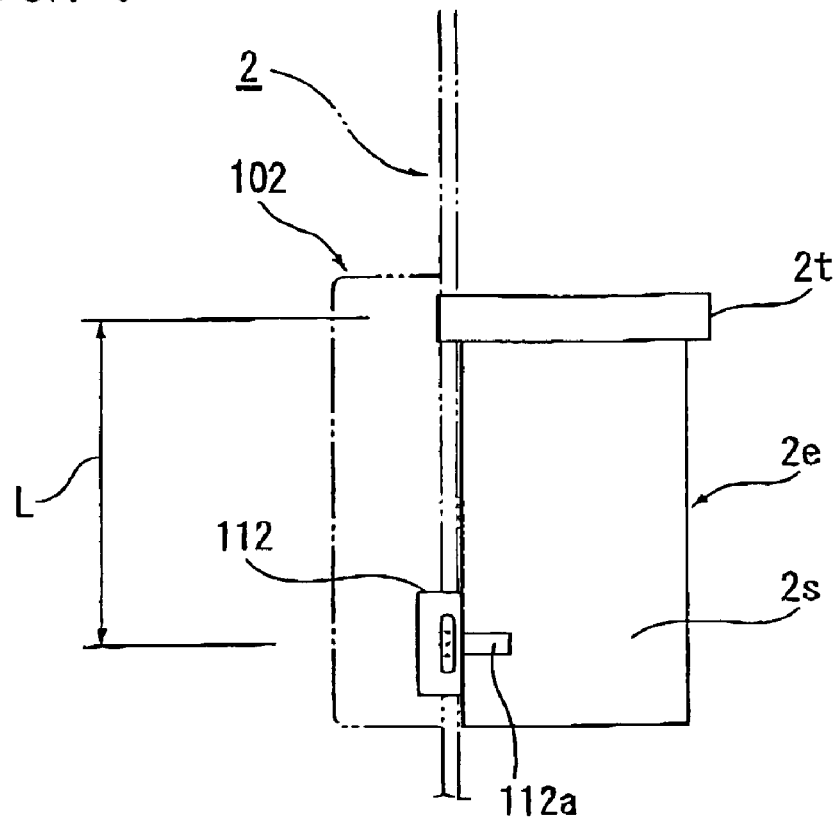
FIG. 7 is a cross section view at the position along X—X line in FIG. 5 in the automobile servomotor controller of the embodiment.
Figure 8:
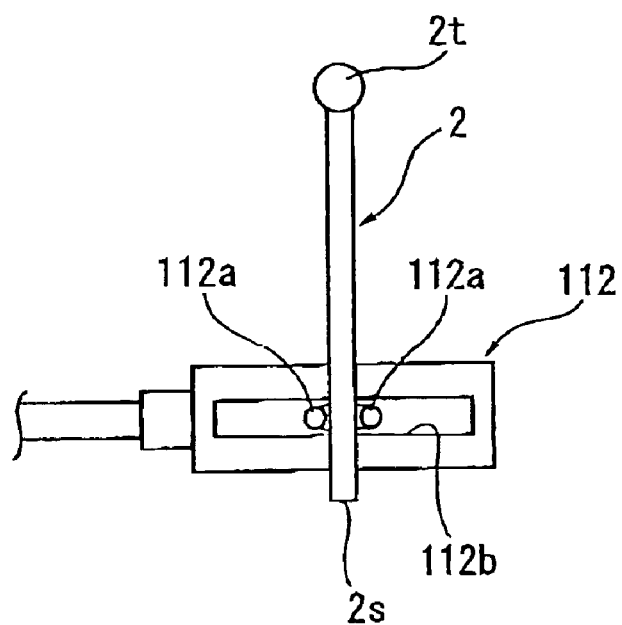
FIG. 8 is a front view of PBR in the automobile servomotor controller of the embodiment.
Figure 9:
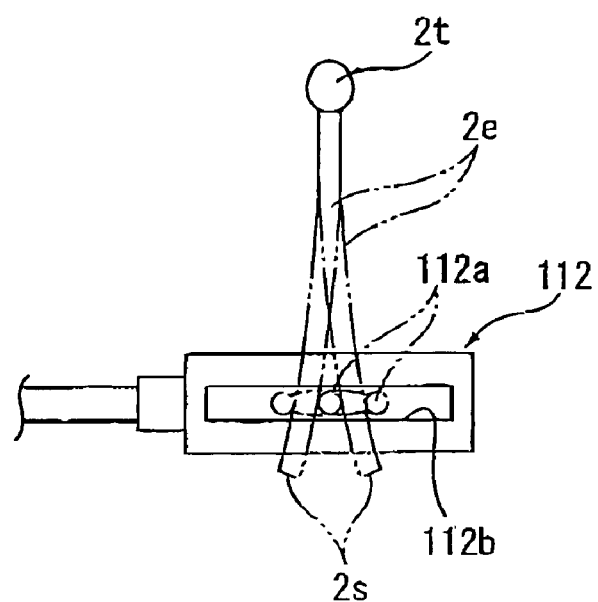
FIG. 9 is a schematic view showing the state when PBR detects the movement of a leading end portion of door in the automobile servomotor controller of the embodiment.

The PBR 112 is disposed with a distance L from a rotating shaft 2t of the intake door 2e as the member to be turned which is driven by the motor 11 illustrated in FIGS. 5, 7, 9.

The PBR 112 is provided with a sliding groove 112b extending in the tangential direction of the turning locus of the radial leading end portion 2s of the intake door 2e and a pair of holding projections 112a, 112a. By sliding along the sliding groove 112b, the pair of holding projections 112a, 112a can detect the rotational position of the leading end portion 2s of the intake door 2e which is slidably held.

Figure 2:
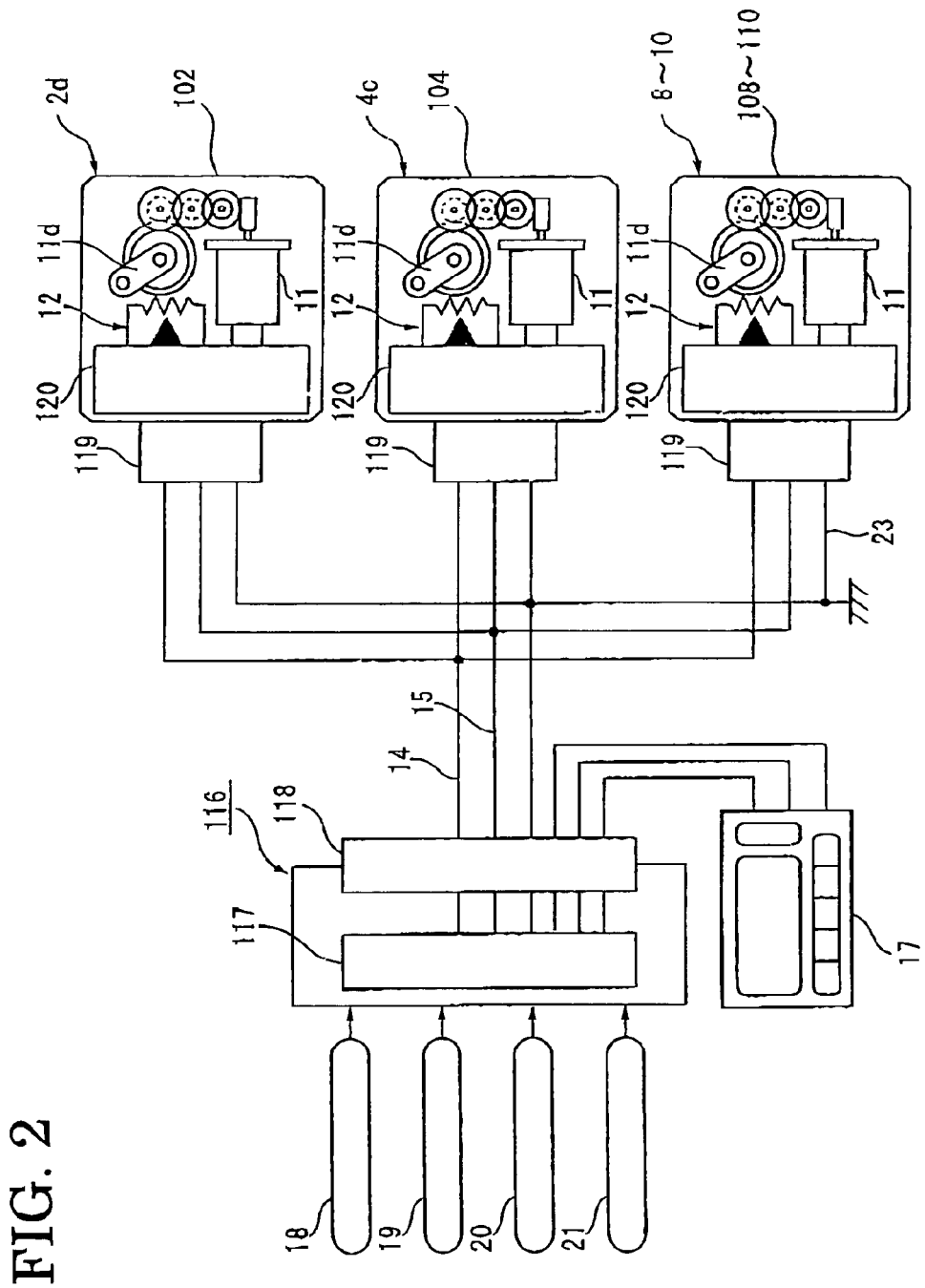
FIG. 2 is a view schematically illustrating the whole structure of the automobile servomotor controller of the embodiment.
Figure 3:
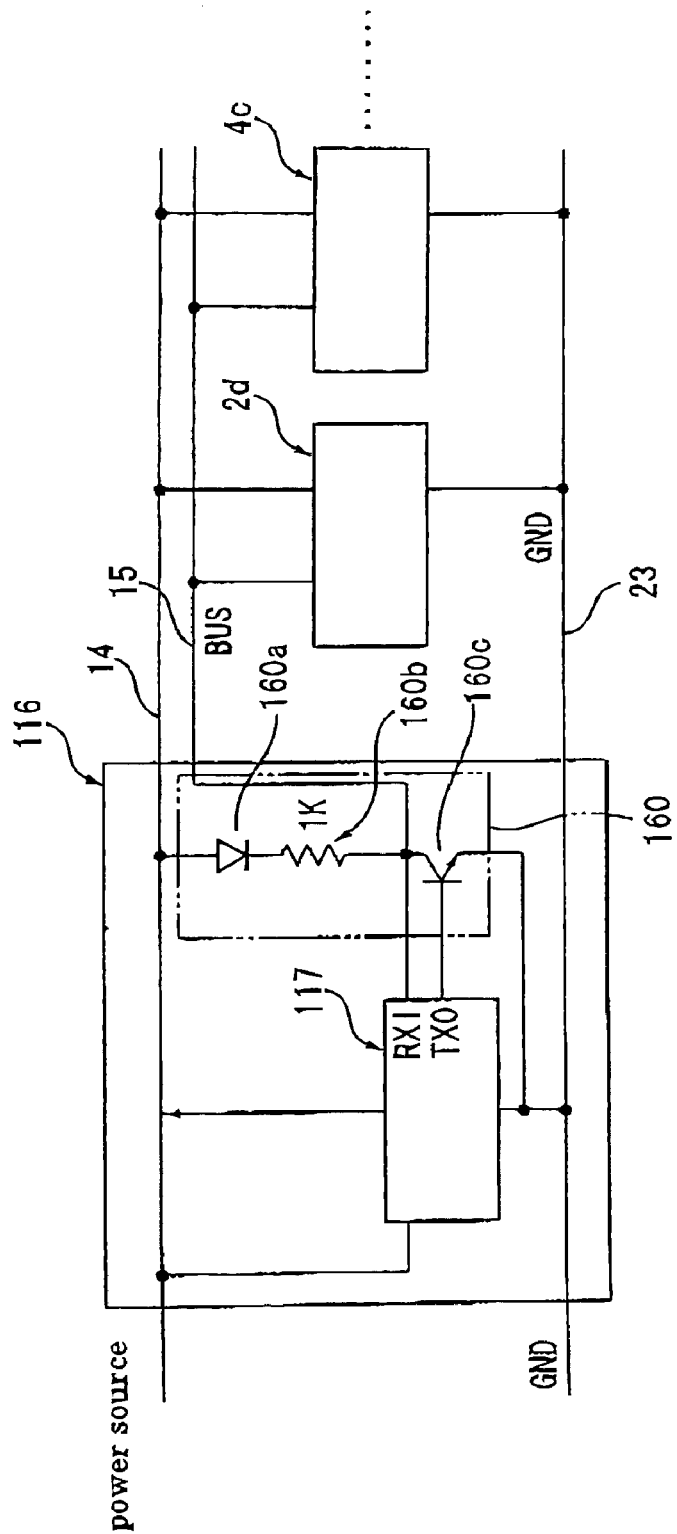
FIG. 3 is a block diagram schematically illustrating the electrical connection of the automobile servomotor controller.

As shown in FIGS. 2, 3, each of the actuators 2d, 4c, and 8 to 10 is connected to an air-conditioning controller 116 through a common power source wire 14, a communication line 15 which is connected to each actuator 2d, 4c, and 8 to 10 via bus, and a ground wire 23 by each of connectors 118, 119 provided in a terminal of each of these wires 14, 15, 23 as shown in FIG. 2.

The communication line 15 to be connected to each of the actuators 2d, 4c, and 8 to 10 via bus, which is provided in the air-conditioning controller 116, is connected to a master control circuit 117 of the air-conditioning controller 116 through a data input/output circuit 160.

The communication line 15 to be connected to each of the actuators 2d, 4c, and 8 to 10 via bus is connected to the master control circuit 117 through the data input/output circuit 160, and the master control circuit 117 is constituted to be capable of individually transmitting a designation signal with an LIN communication signal.

The designation signals to be transmitted with respect to the mode actuators 8 to 10 among the designation signals transmitted from the master control circuit 117 are individually provided with control inhibiting signals for inhibiting the feedback control.

The designation signals to be transmitted with respect to the intake door actuator 2d and the air mixing door actuator 4c among the designation signals transmitted from the master control circuit 117 are individually provided with the control inhibiting signals for inhibiting the feedback control.

In other word, serial data duplex communications are performed between the air-conditioning controller 116 and each of the actuators 2d, 4c, and 8 to 10 via the communication line 15.

A communication protocol is based on the LIN (Local Interconnect Network).

The communication line 15 is pulled up to an anode side via a pull-up resistor 160a (for example, 1 kΩ) and a reverse-flow preventing diode 160b in the data input/output circuit 160.

The transmission of the designation value data is performed by switching an emitter-grounded NPN type transistor 160c based on the designation value signal output from a transmission data-outputting terminal TXO of the master control circuit 117.

Receiving of various data transmitted from each of the actuators 2d, 4c, and 8 to 10 is carried out by effecting binary judgment of voltage supplied to a received data-inputting terminal RXI based on a given voltage threshold value.

In the serial data communication, the air-conditioning controller 116 is on a master side, and each of the actuators 2d, 4c, and 8 to 10 on a slave side. In the slave side, a start bit is detected to take byte-oriented synchronous, and a bit clock is generated to read bit information.

An operation panel 17 and various sensors such as an interior air sensor 18, a fresh air sensor 19, a solar radiation sensor 20, and a suction temperature sensor 21 are connected to the air-conditioning controller 116. The switching operation of the operation panel 17 and the values detected by the interior air sensor 18, the fresh air sensor 19, the solar radiation sensor 20, and the suction temperature sensor 21 are referred to the air-conditioning controller 116, and the rotation frequency of each motor 11 is determined by the master control circuit 117 of the air-conditioning controller 116.

Figure 6:
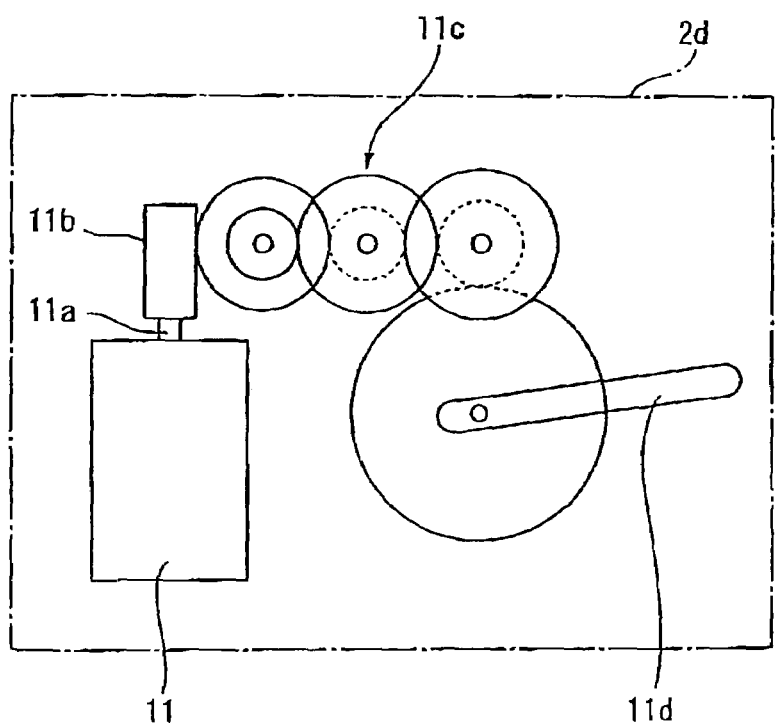
FIG. 6 is a schematic view for illustrating an example of the mechanical arrangement of the intake door actuator as a slave unit in the automobile servomotor controller of the embodiment.

More particularly, as shown in FIG. 6, each of the actuators 2*d*, etc. comprises a motor 11, a worm 11*b* fitted to an output shaft 11*a* of the motor 11, a reduction gear mechanism 1*c* meshing with the worm 11*b*, and an actuator lever lid rotated via the worm 11*ba* and the reduction gear mechanism 11*c*.

As rotating of the actuator lever lid is transmitted to the intake door 2*e* and the like shown in FIG. 5 via a link mechanism not shown, the intake door 2*e*, etc. is turned.

The rotating position of these intake door 2*e*, etc. is detected by the PBR 112.

Figure 4:
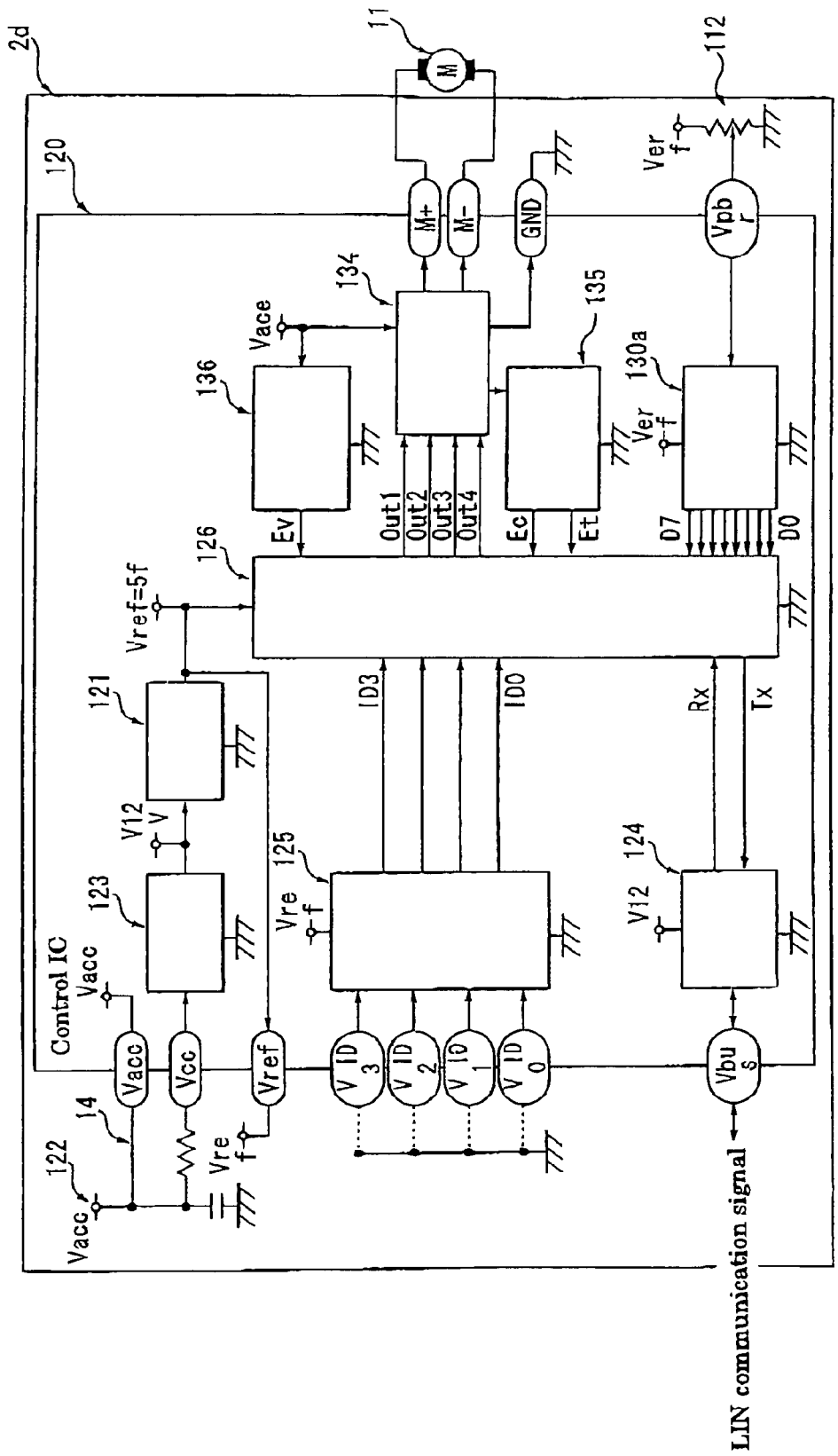
FIG. 4 is a block diagram of the actuator control circuit used for the automobile servomotor controller of the embodiment.

As shown in FIG. 4, the actuator control circuit 120 for controlling each of the actuators 2*d* and the like comprises a power source circuit 121 for generating power source by receiving electric power supply through the power wire 14 from a battery power source 122, an internal power source protection circuit 123 for protecting the power source circuit 121, an LIN input/output circuit 124 for transmitting and receiving the designation signal data with respect to the master control circuit 117 of the air-conditioning controller 116, and a communication ID input-setting circuit 125 for setting an ID code which identifies each actuator control circuit 120.

A logic circuit section 126 of the actuator control circuit 120 is provided with an LIN communication processing logic 127. The LIN communication processing logic 127 extracts the designation signal data having the same ID code with the ID code set by the communication ID input setting circuit 125 from the data received by the LIN input/output circuit 124, and outputs necessary data on which the ID code set by the communication ID input-setting circuit 124 is applied. Here, the LIN communication processing is communication in conformity with the ISO 9141 standard, and its communication method is the UART.

The logic circuit section 126 of the actuator control circuit 120 is provided with new and former designation data latch circuits 128, 129 for maintaining new and former data extracted by the LIN communication processing logic 127, and a first comparator 131 for comparing the value of the designation signal data maintained by the new and former designation data latch circuits 128, 129 based on a communication-establishing trigger which is given from the LIN communication processing logic 127.

The logic circuit section 126 of the actuator control circuit 120 comprises a filtering processing logic 130, a second comparator 132, and a CW, CCW, and HOLD designation signal generating logic 137. The output voltage of the PBR 112 for detecting the opening degree of each door 2*e* is converted from analogue to digital by an A/D inputting circuit 130, and filtering processing is applied to the converted output voltage by the filtering processing logic 130. The second comparator 132 compares the output voltage of the filtering processing logic 130 and the voltage output from the new designation data latch circuit 128, and outputs an output signal depending upon those differences. The CW, CCW, and HOLD designation signal generating logic 137 generates a CW, CCW, and HOLD designation signal by the input of the output voltage of the filtering processing logic 130 and the voltage output from the new designation data latch circuit 128.

In the CW, CCW, and HOLD designation signal generating logic 137, the door position signal and the data of actual open degree of the door after the filtering processing by the filtering processing logic 130 are compared, and the rotating direction and the stopping and holding of the motor 11 are determined based on the deviation of the compared data and signal.

Based on this determination, the CW, CCW, and HOLD designation signal generating logic 137 generates and outputs a rotating direction designation signal (CW, CCW) for instructing the motor 11 to be driven in the normal direction (CW: clockwise direction) to open or close the door or to be driven in a reverse direction (CCW: counterclockwise direction) to open or close the door, so that the feedback control is carried out.

The logic circuit section 126 of the actuator side control circuit 120 is provided with an H bridge driving logic 133 to generate a PWM signal for controlling the electric motor based on the output signals of the first and second comparators 131, 132, and outputs the PWM signal. The CW, CCW, and HOLD instructing signal is input to the H bridge driving logic 133.

An operation permitting trigger signal generating logic 138 for generating an operation permitting trigger signal if the new and former data are not matched in the first comparator 131, and an operation inhibiting signal generating logic 139 for generating an operation inhibiting signal if the value compared between a new designation data and the door position signal fed from the filtering processing logic 130 are matched in the second comparator 132 are connected to the H bridge driving logic 133 through an operation permitting/inhibiting signal processing logic 140. An operation permitting/inhibiting signal as an operation signal is input to the H bridge driving logic 133.

Further, if the control inhibiting signal is included in the designation signal, the LIN communication logic 127 transmits switching (constant-inhibiting) signal receiving data to the operation permitting/inhibiting signal processing logic 140 as shown in FIG. 1.

In the operation permitting/inhibiting signal processing logic 140, if a constant-inhibiting signal is input with the target reached state from the switching (constant-inhibiting/constant-permitting) signal receiving data, non-feedback control for inhibiting the operation of the motor 11 until a target is changed by the input of a new designation signal of the non-feedback control unit is carried out regardless of the input of the CW, CCW, and HOLD designation signal.

In the LIN communication processing logic 127, if the control permitting signal is included in the designation signal, the switching (constant-permitting) signal receiving data is transmitted to the operation permitting/inhibiting signal processing logic 140 as illustrated in FIG. 1.

If the constant-permitting signal receiving data is input to the operation permitting/inhibiting signal processing logic 140, the operation signal is output to the H bridge driving logic 133 for performing the normal feedback control.

The H bridge driving logic 133 generates the PWM signal based on the CW, CCW, and HOLD designation signal and the operation permitting/inhibiting signal. The H bridge output circuit (driving means) 134 of the actuator control circuit 120 drives the motor 11 based on the PWM signal output from the H bridge driving logic 133.

In other words, after the operation permitting/inhibiting signal processing logic 140 compares the new designation data and the former designation data of standard data input to the first comparator 131, if the new designation data is higher than the former designation data by a predetermined value or more, the H bridge driving logic 133 normally drives the motor 11 by using the H bridge output circuit 134.

If the new designation data is lower than the former designation data by a predetermined value or more, the H bridge driving logic 133 reversely drives the motor 11 by using the H bridge output circuit 134.

After the operation permitting/inhibiting signal processing logic 140 compares the new designation data input to the second comparator 132 and the present position data fed from the filtering processing logic 130 of the present door position data, if the new designation data is higher than the present position data by a predetermined value or more, the H bridge driving logic 133 normally drives the motor 11 by using the H bridge output circuit 134.

If the new designation data is lower than the present position data by a predetermined value or more, the H bridge driving logic 133 reversely drives the motor 11 by using the H bridge output circuit 134.

If the new designation data is in a predetermined range with respect to the former designation data in the first comparator 131, and also is in a predetermined range with respect to the present position data in the second comparator 132, the motor 11 is determined to be a stoppage state, and the CW, CCW, and HOLD designation signal generating logic 137 generates the HOLD designation signal and stops the driving of the motor 11.

As shown in FIG. 4, the actuator control circuit 120 is provided with an excess current and excess temperature detecting circuit 135 as an abnormality detecting section for generating an excess current detecting output when the current to be fed to the motor 11 via the H bridge output circuit 134 exceeds a previously set allowable value.

The excess current and excess temperature detecting circuit 135 of this embodiment is provided with an excess temperature detecting function for observing the temperature of the motor 11 based on the detected output of a temperature detecting element (not shown) such as thermistor disposed in the motor 11 and for generating an excess temperature detecting output when the temperature of the motor 11 exceeds a previously set allowable temperature.

Further, the actuator control circuit 120 is provided with an excess voltage detecting circuit 136 as an abnormality detecting section for generating an excess voltage detecting output when the voltage (the voltage of the battery power source 122) to be applied to the motor 11 exceeds a previously set allowable value.

If any one of the excess current, the excess temperature, or the excess voltage is detected by each of the detecting circuits 135, 136, excess current, excess temperature, or excess voltage signal transmitting data as an abnormality signal is transmitted from an excess current, excess temperature, and excess voltage detecting logic 141 provided in the logic circuit section 126 to the operation permitting/inhibiting signal processing logic 140, and the H bridge output circuit 134 and the motor 11 are protected by stopping the motor 11.

Next, the structure of the LIN communication signal including the designation signal will be explained.

Figure 11D:
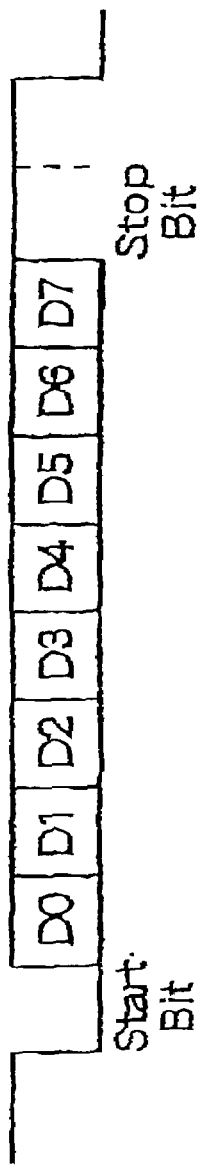
FIGS. 11D, 11E, and 11F show a data 1 field (DATA1), a data 2 field (DATA2), and a Check sum field, respectively.
Figure 11E:
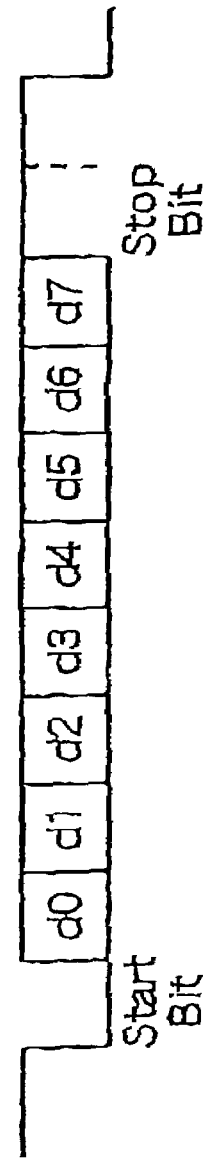
Figure 11F:
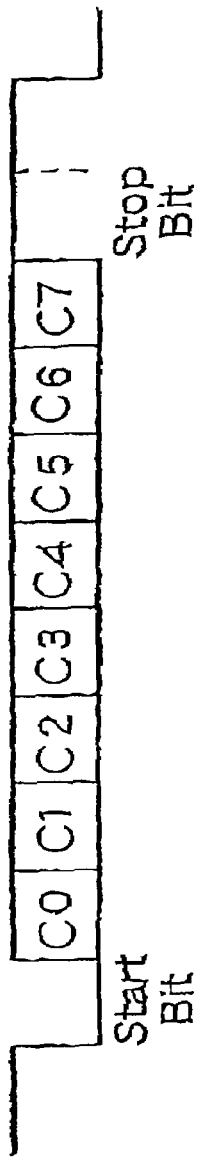
Figure 12:
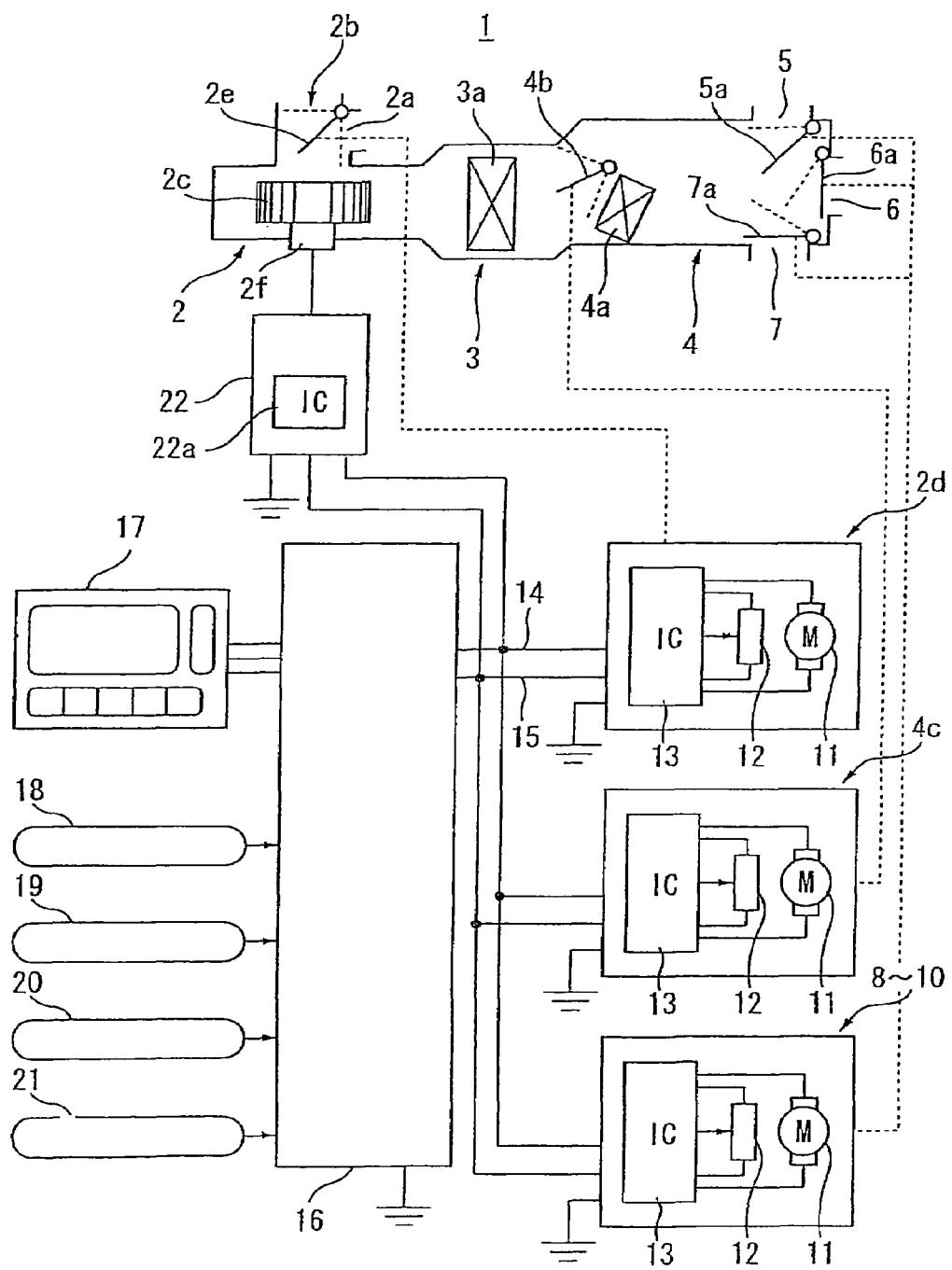
FIG. 12 is a schematic view showing the whole structure in the automobile servomotor controller of a conventional example.
Figure 13:
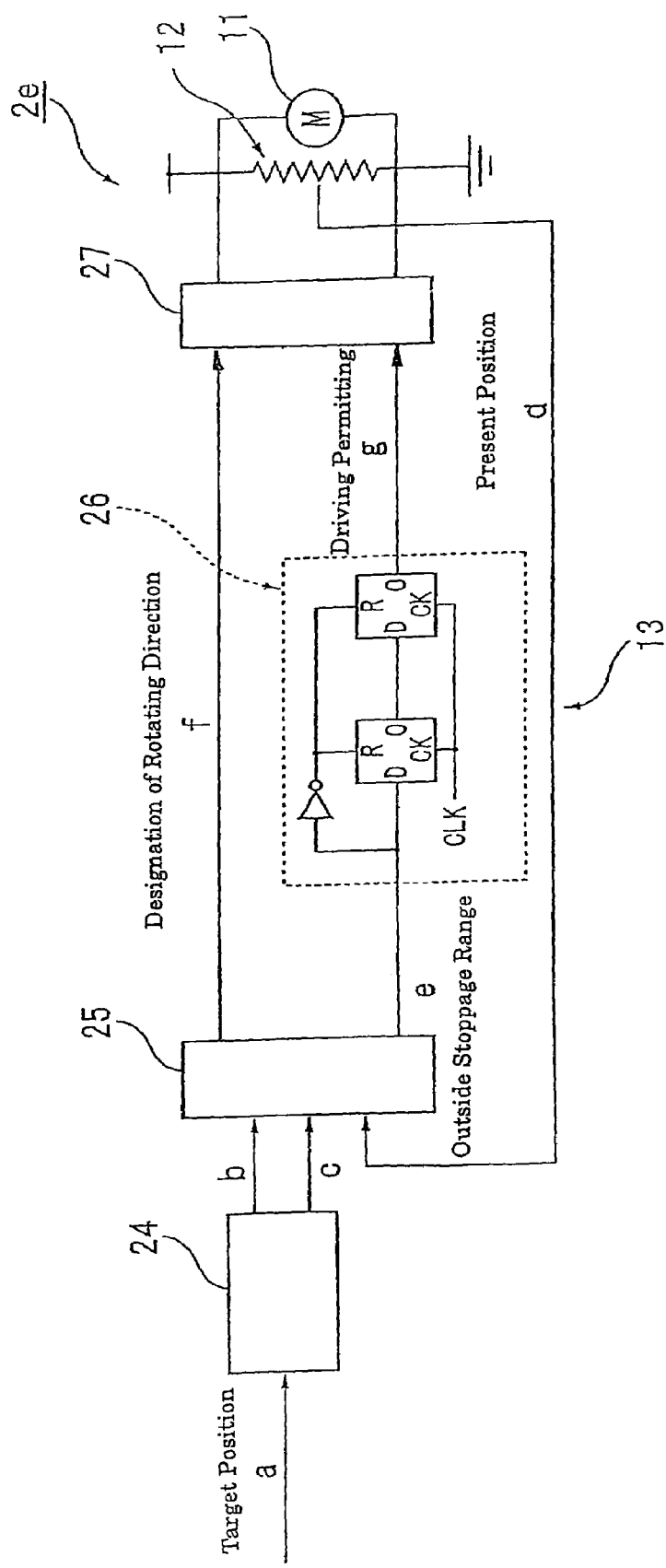
FIG. 13 is a block diagram showing the structure of the actuator side control circuit in the automobile servomotor controller of another conventional example.
Figure 14:
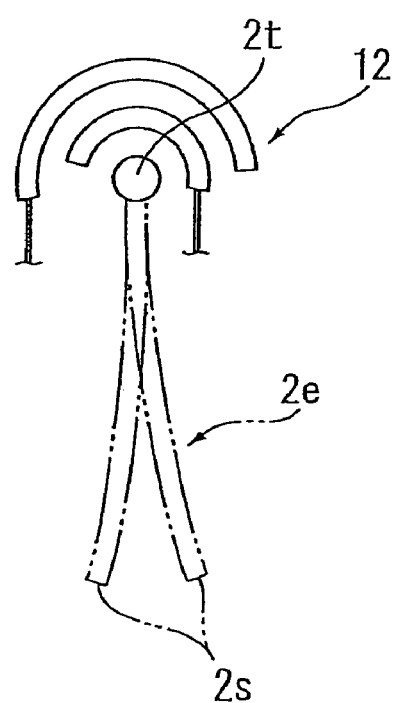
FIG. 14 is a schematic view illustrating PBR provided around the shaft of the conventional example.

In this embodiment, as shown in FIGS. 10, 11, one frame of the LIN standard consists of a synch break field (Synch Break) illustrated in FIG. 10A, a synch field (Synch) illustrated in FIG. 10B, an ID field (ID) illustrated in FIG. 10C, a data 1 field (DATA1) shown in FIG. 11D, and a data 2 field (DATA2) illustrated in FIG. 11E, and a check sum field (Checksum) shown in FIG. 11F.

For example, in the data 1 field (DATA1) shown in FIG. 11D, a signal with the control inhibiting signal and a signal without the control inhibiting signal are provided in the designation signal by the lowest-place 1 bit or complex data using 2 bit. The signal which includes the control inhibiting signal in the designation signal (for example $D7=1$) is individually transmitted to the mode actuators 8 to 10 of the non-feedback control units, and the signal which does not include the control inhibiting signal in the designation signal (for example, $D7=0$) is individually transmitted to the intake door actuator 2d and the air mixing door actuator 4c of the feedback control units.

If the signal which includes the control inhibiting signal in the designation signal (for example, $D7=1$) is received in the LIN communication processing logic 127, and the signal is determined as the designation signal to the self actuator, the LIN communication processing logic 127 transmits the constant-inhibiting signal to the operation permitting/inhibiting signal processing logic 140.

If the signal which does not include the control inhibiting signal in the designation signal (for example, $D7=0$) is received in the LIN communication processing logic 127, and the signal is determined as the designation signal to the self actuator, the LIN communication processing logic 127 transmits the constant-permitting signal to the operation permitting/inhibiting signal processing logic 140.

Next, the operation of the automobile servomotor controller of the embodiment will be described.

In the automobile servomotor controller of this embodiment, the LIN communication signal transmitted from the master control circuit 117 of the air-conditioning controller 116 through the communication line 15 is received by each of the actuator control circuits 120, and then each of the doors 2e, 4b, 5a, 6a, and 7a is rotated to a predetermined opening or closing position.

Here, the signal including the control inhibiting signal in the designation signal (for example, $D7=1$) is individually transmitted to the mode actuators 8 to 10 of the non-feedback control units, so that the constant-inhibiting signal is transmitted from each of the LIN communication processing logics 127 of each mode actuator 8 to 10.

If the constant-inhibiting signal is input to the operation permitting/inhibiting signal processing logic 140 of the mode actuator 8 to 10, the operation of the motor 11 is inhibited with the target reached state until the target is changed by the input of next new designation signal of the non-feedback control unit regardless of the input of the CW, CCW, and HOLD designation signal.

Consequently, even though each of the doors 5a, 6a, and 7a to be opened and closed by each of the actuator control circuits 120 of the mode actuators 8 to 10 is made of an inflexible hard material, the non-feedback control is carried out by each of the logic circuit sections 126, so that there is no possibility of producing chattering.

Moreover, the signal which does not include the control inhibiting signal in the designation signal (for example, $D7=0$) is individually transmitted to each of the intake door actuator 2d and the air mixing door actuator 4c of the feedback control units.

In each of the intake door actuator 2d and the air mixing door actuator 4c, the constant permitting signal is transmitted from each of the LIN communication processing logics 127 of each of the intake door actuator 2d and the air mixing door actuator 4c.

Even though each of doors 2d, 4c to be opened and closed by each actuator control circuit 120 of the intake door actuator 2d and the air mixing door actuator 4c is made of a flexible soft material, and the positions of the intake door 2e and the air mixing door 4b are changed by airflow, the intake door actuator 2d and the air mixing door actuator 4c carry out the feedback control by the logic circuit portion 126. Therefore, the actuator having a favorable positional accuracy is obtained.

In this embodiment, the movement of the leading end portion 2s of the intake door 2e is detected by the PBR 112 which is disposed with the distance L from the rotation center of the rotation shaft 2t of the intake door 2e as shown in FIG. 7.

Even though the intake door 2e is deformed by the airflow and the position of the leading end portion 2s of the intake door 2e is shifted, the movement of the leading end portion 2s can be detected while sliding the pair of holding projections 112a, 112a along the sliding groove extending in the tangential direction of the turning locus of the radial leading end portion 2s of the intake door 2e as illustrated in the two-dot chained line in FIG. 9, for example.

Accordingly, the feedback control having preferable accuracy can be carried out by using a value close to the change in the actual air distribution cross-sectional area, and the control of the intake door 2e with preferable positional accuracy is carried out depending upon the opening and closing degree of the intake door 2e, compared to the conventional actuator which applies the feedback control to the opening and closing degree of the intake door 2e from the rotational angle around the rotation shaft 2t.

With the target reached state, the control inhibiting signal for inhibiting the feedback control is individually fed from the master control circuit 117 of the air-conditioning controller 116 to each of the mode actuators 8 to 10 in order to inhibit the operation of the motor 11 until the target is changed by the input of the new designation signal.

Accordingly, with the target reached state, each of the mode actuators 8 to 10 is operated as the non-feedback control unit for inhibiting the operation of the motor 11 until the target is changed by the input of the new designation signal, and the operation of the motor is inhibited until the target is changed by the input of the new designation signal with the target reached state.

Each of the mode actuators 8 to 10 is operated as the non-feedback control unit by providing each of the mode actuators 8 to 10 in the place where chattering occurs, so that the chattering is prevented, the actuators are used as the actuators which have no influence of outside noise.

In the intake door actuator 2d for driving the motor 11 by detecting the present position value with the PBR 112 to reach at the target state, the constant-permitting signal for constantly permitting the feedback control is transmitted from the master control circuit 117 without providing the control inhibiting signal for inhibiting the feedback control, and the feedback control can be constantly performed in accordance with the designation signal.

Even though the actuators which perform the feedback control are connected to the same communication line 15 to which the same indication signal with the non-feedback control unit is transmitted, the desirable feedback control operation is individually carried out without individually providing the control inhibiting signal for inhibiting the feedback control to the actuators which require the positional accuracy.

The feedback control unit is accordingly constructed by the same structure using the actuator control circuit 120 conducting the feedback control without using a plurality of communication lines 15, thus reducing the number of lines.

All of the slave units can be constructed by the same control IC without preparing a plurality of custom ICs. Therefore, increase in the manufacturing cost can be controlled.

Moreover, in this embodiment, each of the actuators, the intake door actuator 2d, the air mixing door actuator 4c, and the mode actuators 8 to 10 behaves as the self-feedback control unit for constantly performing the feedback control by itself or the non-feedback control unit which does not control the motor 11 until the target is changed by the input of new designation signal. Therefore, each of the actuators hardly includes outside noise compared to an actuator which individually carries out the feedback control by the indication signal transmitted using the communication line 15 from the master control circuit 117 after the actuator transmits the present position value signal of each door 2e detected by the PBR 112 every time to the master control circuit 117 by using the communication line 15. Consequently, the generation of the chattering is decreased, and the actuator having the preferable positional accuracy can be obtained.

Because the movement of the leading end portion 2s of the intake door 2e is detected by the PBR 112, the movement of the leading end portion 2s can be detected even though the position of the leading end portion 2s is shifted by the airflow capacity, for example. The feedback control is accordingly performed depending upon the change in the opening and closing degree of the intake door 2e.

Furthermore, the actuator unit can be operated as the non-feedback control unit by sending the control inhibiting signal in the place where the chattering occurs. Therefore, the chattering, etc. is prevented.

Although a plurality of the same structured feedback control units are provided by connecting to the same communication line 15, the slave unit can be used as the two types of actuators: the actuator as the feedback control unit having a preferable position reaching accuracy and the actuator as the non-feedback control unit without having influence of outside noise.

As described above, the automobile servomotor controller of the embodiment of the present invention was described with reference to the drawings. However, the specific structure is not limited to this embodiment, and a structural change is included in the present invention unless the structural change departs from the scope of the present invention.

In the present embodiment, as the examples of the flexible and deformable doors, the intake door 2e and the air mixing door 4b to be controlled by the intake door actuator 2d and the air mixing door actuator 4c are described; however, each of the mode doors 5a, 6a, and 7a may be the door which is made of a flexible and deformable material, and may be controlled to be opened and closed by the feedback control unit of the same structure with another actuator.

The present invention is not limited to the actuator in which the actuator for controlling the flexible and deformable door and the actuator for controlling the flexible and deformable door are existed and connected to the same communication line 15 in an automobile. The actuator in which an actuator for controlling a flexible and deformable door and an actuator for controlling an inflexible door are used depending upon an automobile type can be adopted. In this case, all of the actuator control circuits 120 of both automobiles can be constructed by the same control IC, so that the increase in the manufacturing cost is further controlled.

The control of the actuator for controlling the door is switched in accordance with the flexibility and deformability of the door, but the control of the actuator may be switched depending upon load differences generated by differences in the size, shape, opening and closing degree, and rotating degree of the door.

In the present embodiment, the control inhibiting signal and the control permitting signal included in the designation signal with respect to the non-feedback control unit or the feedback control unit is switched by the difference of 1 bit data; however, the signal may be switched by the difference of the complex data more than 1 bit.

As described above, the invention described in claim 1, the control inhibiting signal for inhibiting the feedback control is individually transmitted from the master control circuit to the non-feedback control unit for inhibiting the operation of the motor until the target is changed by the input of the new designation signal with the target reached state.

Therefore, with the target reached state, the actuator unit is operated as the non-feedback control unit for inhibiting the operation of the motor until the target is changed by the input of the new designation signal, and the operation of the motor is inhibited until the target is changed by the input of the new designation signal.

The actuator unit can be operated as the non-feedback control unit to prevent the chattering by providing the non-feedback control unit to which the control inhibiting signal is transmitted in the place where the chattering occurs. The actuator is accordingly not influenced by outside noise.

In the feedback control unit for driving the motor, in order for the present position value to be changed to the target state by detecting the present position value with the position detecting means, the feedback control can be conducted in accordance with the designation signal transmitted from the master control circuit without providing the control inhibiting signal for inhibiting the feedback control.

The control inhibiting signal for inhibiting the feedback control is not transmitted to the actuator which requires the positional accuracy, so that a desirable feedback control can be individually performed even if the actuator is connected to the same communication line to which the same indication signal with the non-feedback control unit is transmitted.

All of the slave units are accordingly constructed by the same feedback control unit without requiring a plurality of communication lines, thus reducing the number of lines.

Therefore, the increase in the manufacturing cost can be controlled.

In one embodiment of the invention, the movement of the leading end portion is detected by the PBR. Therefore, the movement of the leading end portion can be detected although the position of the leading end portion of the member to be turned is shifted by airflow capacity.

The feedback control can be carried out in accordance with the change in the opening and closing degree of the member to be turned.

Furthermore, the actuator is operated as the non-feedback control unit by transmitting the control inhibiting signal in the position where the chattering occurs, so that the chattering can be prevented.

The slave unit is used as the actuator having a preferable positional accuracy and the actuator without being influenced by outside noise by the same feedback control unit.

What is claimed is:

1. An automobile servomotor controller, comprising:
    a master control unit having a master control circuit for transmitting a data packet through a single conductor communication bus; and
    a plurality of slave units each having a motor and a control circuit that is connected to the master control unit through said communication bus and transmits control data to a driving device configured to drive the motor for controlling rotation of the motor depending upon contents of said data packet wherein,
    each of said slave units comprises a feedback control unit, which conducts a feedback control to the rotation of the motor so as to achieve a target reached state according to the data packet contents by detecting a position value with a position detecting device,
    the master control circuit is configured to transmit the data packet enclosing a control signal for inhibiting the feedback control to the control circuit of any one of the slave units, and
    the control circuit includes an operation permitting/inhibiting signal processing logic, which switches the feedback control to a non-feedback control for inhibiting the operation of the motor until the reception of a new data packet that changes the target position with respect to the target reached state, when the control circuit receives the data packet enclosing the control signal from the master control circuit.

2. The automobile servomotor controller according to claim 1, wherein said master control unit comprises an air-conditioning amplifier.

3. The automobile servomotor controller according to claim 1, wherein one of said plurality of slave units comprises a mode actuator provided corresponding to a door.

4. The automobile servomotor controller according to claim 1, wherein said feedback control unit includes an actuator.

5. The automobile servomotor controller according to claim 1, wherein said position detecting device is provided apart from a center of a rotation shaft of a member to be turned by said motor, and is a PBR for detecting a position adjacent to a radial leading end portion of the member to be turned by the movement of the leading end portion along a turning locus.

6. The automobile servomotor controller according to claim 5, wherein said PBR is provided with a sliding groove extending in the tangential direction of the turning locus of the radial leading end portion of the member and a pair of holding projections slidable in the sliding groove.

* * * * *